United States Patent
Mummert et al.

(10) Patent No.: US 7,698,710 B1
(45) Date of Patent: Apr. 13, 2010

(54) SYSTEM AND METHOD TO IMPROVE SERVICE IN A GROUP OF SERVERS

(75) Inventors: Lily Barkovic Mummert, Mahopac, NY (US); William G. Pope, Somers, NY (US)

(73) Assignee: International Business Machines Corporation, Armonk, NY (US)

(*) Notice: Subject to any disclaimer, the term of this patent is extended or adjusted under 35 U.S.C. 154(b) by 1603 days.

(21) Appl. No.: 09/692,596

(22) Filed: Oct. 19, 2000

(51) Int. Cl.
G06F 15/16 (2006.01)
G06F 15/173 (2006.01)
G06F 9/46 (2006.01)

(52) U.S. Cl. ............... 718/105; 709/201; 709/226; 709/223; 709/244; 718/104

(58) Field of Classification Search ......... 709/201, 709/217, 219, 221, 238, 223, 244, 224, 226; 718/105, 104, 102
See application file for complete search history.

(56) References Cited

U.S. PATENT DOCUMENTS

| | | | | |
|---|---|---|---|---|
| 5,408,663 A * | 4/1995 | Miller | .................. | 718/104 |
| 5,473,773 A * | 12/1995 | Aman et al. | ............... | 718/104 |
| 5,603,029 A * | 2/1997 | Aman et al. | ............... | 718/105 |
| 5,681,238 A * | 10/1997 | Minowa et al. | ............ | 477/102 |
| 5,819,033 A * | 10/1998 | Caccavale | .................. | 709/224 |
| 5,819,083 A * | 10/1998 | Chen et al. | .................... | 707/10 |
| 5,898,870 A * | 4/1999 | Okuda et al. | ................ | 718/104 |
| 5,974,462 A * | 10/1999 | Aman et al. | ............... | 709/225 |
| 6,119,174 A * | 9/2000 | Borowsky et al. | ........... | 710/15 |
| 6,230,183 B1 * | 5/2001 | Yocom et al. | ............... | 718/105 |
| 6,263,359 B1 * | 7/2001 | Fong et al. | .................. | 718/103 |
| 6,311,144 B1 * | 10/2001 | Abu El Ata | ................... | 703/2 |
| 6,360,256 B1 * | 3/2002 | Lim | ......................... | 709/223 |
| 6,393,455 B1 * | 5/2002 | Eilert et al. | ................ | 718/105 |
| 6,427,152 B1 * | 7/2002 | Mummert et al. | ........... | 707/102 |
| 6,516,348 B1 * | 2/2003 | MacFarlane et al. | ....... | 709/224 |
| 6,542,854 B2 * | 4/2003 | Yang et al. | ................. | 702/186 |
| 6,574,605 B1 * | 6/2003 | Sanders et al. | ............... | 705/8 |
| 6,661,889 B1 * | 12/2003 | Flockhart et al. | ...... | 379/265.05 |
| 6,898,564 B1 * | 5/2005 | Odhner et al. | ............... | 703/21 |
| 6,957,209 B1 * | 10/2005 | Quernemoen | ......... | 340/310.11 |
| 6,996,517 B1 * | 2/2006 | Papaefstathiou | ............ | 703/22 |
| 7,051,188 B1 * | 5/2006 | Kubala et al. | ................ | 712/29 |
| 2001/0054097 A1 * | 12/2001 | Chafe | ........................ | 709/224 |
| 2003/0236745 A1 * | 12/2003 | Hartsell et al. | ............... | 705/40 |

* cited by examiner

*Primary Examiner*—Yves Dalencourt
*Assistant Examiner*—Gregory G Todd
(74) *Attorney, Agent, or Firm*—Anne Vachon Dougherty

(57) ABSTRACT

A system and method for evaluating workload units in a computer system whereby each workload unit is assigned an impact number representing the number of days that the expiration date of a computer system would be changed if the workload unit were to be added or removed from the system with all other workload units remaining the same. Each workload unit may be assigned a different number for each system in the environment. The inventive system and method simplify the task of combining multidimensional workload measures and incorporate the interaction with other workload units in the system by assessing the impact on both a donor and a recipient computer systems' expiration dates. Thus, the invention provides a more robust way to measure the effect of moving workload units between systems to result in a better allocation of work amongst computer systems in a processing environment.

20 Claims, 11 Drawing Sheets

SYSTEM AND METHOD TO IMPROVE SERVICE IN A GROUP OF SERVERS

FIELD OF THE INVENTION

The invention relates generally to the field of computer systems and more particularly to a system and method for optimizing computer resource usage across a plurality of computer systems.

BACKGROUND OF THE INVENTION

In the capacity planning process, system parameters, desired service levels, and workload predictions are used to determine when the resources of a computer system will be exceeded and are used to assist in identifying cost-effective remedies to resource shortfalls. "Capacity Planning and Performance Modeling: From Mainframes to Client-Server Systems", by Daniel A. Menasce, Virgilio A. Almeida, and Larry W. Dowdy (Prentice Hall, Englewood Cliffs, N.J., 1994) discloses approaches to both the predicting and rectifying of computer resource challenges.

Capacity planning for a set of heterogeneous computer systems presents several problems, as set forth below. As a first challenge, it must be recognized that workloads use multiple resources. Therefore, the effect of workload assignment is not readily predicted or quantified. Second, workload typically grows, and the rate of growth may differ between resources. Third, different computer systems may have different resources, and different resource capacities. These problems can make it difficult to determine how long available resources will last, which computer systems are most at risk for exceeding their resources, how to reallocate resources to alleviate shortages, and how the computer systems will be affected by such reallocations.

Dan Asit and Dinkar Sitaram, in U.S. Pat. No. 5,530,557, entitled "Online Placement of Video Files Determined by a Function of the Bandwidth to Space Ratio of each of the Storage Devices in a Server Environment", (Jun. 25, 1996) teach one solution for maximizing storage utilization for the placement of videos on storage devices taking into account the expected demand for the video. Asit, et al use the bandwidth space ratio (BSR) to place videos on disks. The BSR of a disk is its bandwidth divided by space. The BSR of a video is the expected demand for the video divided by the space required to store it. Demand may be forecast based on historical usage data and, in their invention, a Video Placement Manager places the videos on the disks to match the BSR of the videos with the BSR of the disk.

Additional references which have sought to predict and manage storage capacity include an article and related patent application of W. G. Pope and Lily Mummert. The article entitled "The Use of Life Expectancy to Manage Notes Domino E-Mail Storage", Proceedings of the Computer Measurement Group, CMG '99, December 1999, and the patent application Ser. No. 09/457,467 entitled "System and Method for Providing Property Histories of Objects and Collections For Determining Device Capacity Based Thereon", which was filed on Dec. 8, 1999, propose a method for projecting device capacity by past history of access to and usage of the relevant information for a single computer system.

In general, the amount of workload on a computing system grows over time. Eventually, workload exceeds the system's capacity causing either unscheduled outages or severe performance degradation which results in increased administrative costs and reduced customer satisfaction. When the server is a member of a group of servers where workload can be moved to some other server in the group, it is desirable to avoid these problems with planned action, as will be addressed by the present invention.

The date when a server's workload exceeds its capacity is called its expiration date. An expiration date is established using the aforementioned methods like life expectancy or capacity space. To provide a quality service, it is necessary to upgrade or offload the server before its expiration date. Usually, there are certain key dates when major changes can be made to a server with minor impact to service. These dates are conventionally associated with holidays, whereby service impact is reduced if servers are upgraded on a key date that precedes the expiration date.

Other resources, such as administrative personnel, are normally in limited supply. This constraint bounds the number of server upgrades that can be performed on any given key date. Thus, it is necessary to distribute the expiration dates of servers to fit within the bounds dictated by these other resources. A system's expiration date can be adjusted by adding or removing workload.

What is needed is a system and method which analyzes the combined expiration dates of a group of systems and adjusts the location of workload to align the expiration dates of systems in the group with key dates in order to fit within the bounds dictated by external resources.

What is additionally needed is to provide a system and method for analyzing the impact of a single workload unit on the capacity of a system.

Another objective of the present invention is to utilize workload unit impact measurements to improve the life expectancies of as many of the processing systems in a processing environment as possible.

SUMMARY OF THE INVENTION

The foregoing and other objectives are realized by the present system and method which utilizes a single measure for the workload unit. This measure is called the impact which is measured in time (usually days) and represents the effect of the workload unit on the expiration date of the system. The method is more robust in that the measure of a workload unit is calculated in relation to a specific processing system and the other workload assigned to the system, other than the workload unit in question. This measurement technique is effective and relevant for an iterative planning process that examines the movement of workload units to achieve a desired configuration of expiration dates within a processing environment.

The system and method of the present invention provide for evaluating workload units in a computer system whereby each workload unit is assigned an impact number representing the number of days that the expiration date of a computer system would be changed if the workload unit were to be added or removed from the system with all other workload units remaining the same. The impact number for a given workload unit may differ depending upon the system to which it is assigned. The inventive system and method simplify the task of combining multidimensional workload measures and incorporate the interaction with other workload units in the system by assessing the impact on both a donor and a recipient computer systems' expiration dates. Thus, the invention provides a more robust way to measure the effect of moving workload units between systems to result in a better allocation of work amongst computer systems in a processing environment.

BRIEF DESCRIPTION OF THE DRAWINGS

The invention will now be described in greater detail with specific reference to the appended drawings wherein.

DETAILED DESCRIPTION OF THE INVENTION

Figure 1:
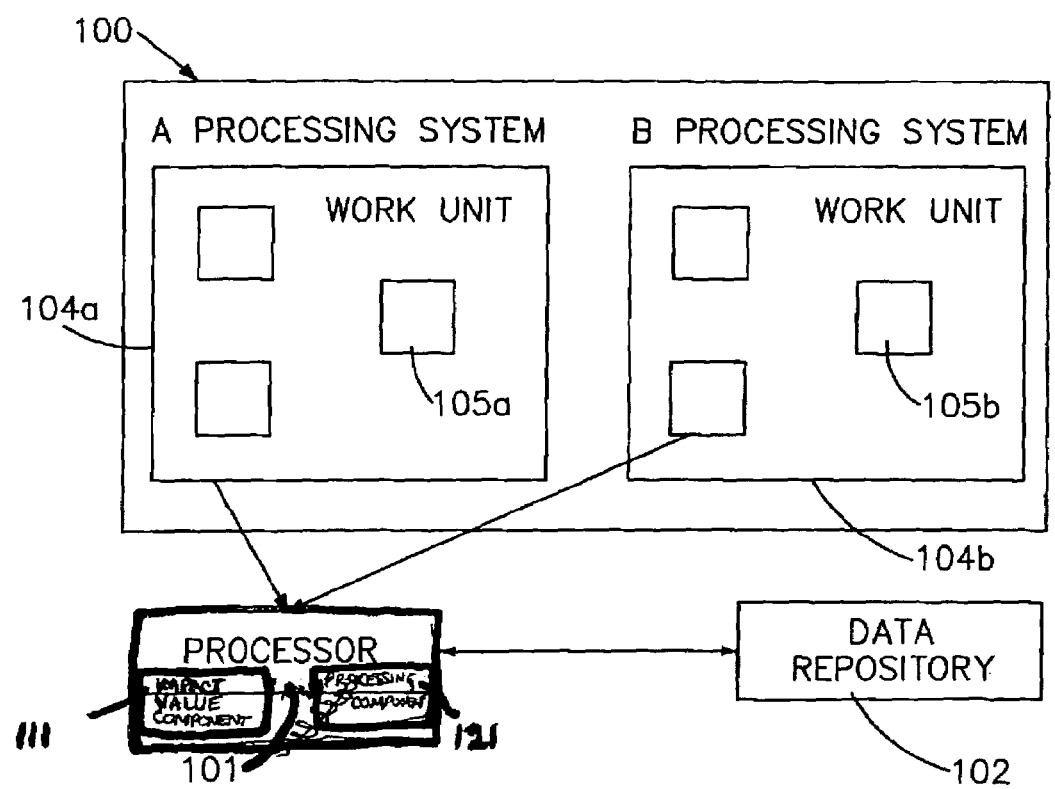
FIG. 1 illustrates a processing environment for implementing the present invention.

For the ensuing description of the invention, the following terms will be used:

An administrative processor is a computer system with the capability to execute computer software and programs. Here the term administrative processor refers to hardware including at least a central processing unit along with the memory and input/output interfaces for transferring digital data between the inside of the system and the outside world and the operating and support software, i.e. operating system and support subsystems that allow the hardware devices to be used. The term administrative processor is not meant to include any devices for the permanent storage of data. The administrative processor may be part of a separate processing system (as shown in FIG. 1) or may be a component of one of the processing systems in the processing environment for which the workload analysis is to be conducted. More than one administrative processor can serve a single processing environment.

A repository is a means for storing structured data external to the administrative processor. Data in the repository is saved and accessed in a storage subsystem but is also supported by software, such as relational database software, that provides access to the structure of the data. Database software is not essential for a repository as the content of the repository can be stored in simpler storage objects, such as a flat file.

A processing system is a computing system that includes all the hardware and software needed to execute computer programs. This includes the central processing unit (CPU) or multiple CPUs, memory, storage and network connectivity as well as the operating system, application software and procedures for managing work on the system.

Workload is the set of identifiable tasks that execute in the processing system and utilize or consume the resources of the system.

A workload unit is a subset of the workload that can be associated with some external identifier (e.g., the collection of all tasks executed by an employee user.) Workload units are a collection point for keeping historical records about resource consumption and act as a means to allocate workload to a specific processing system. Workload units may execute anywhere in the processing environment, subject only to resource constraints.

A container is a generalized term that represents an identifiable and limited part of a resource that has a limit, or capacity. A storage container might be a disk partition or an entire physical device, limited by its size. A processing container might be a CPU, a set of CPUs, or a specific type of server. The limit might be some number of instructions or transactions per unit time. A network container could be an interface, or the network itself, and the limit could be the bandwidth. In any case, the resource has a limit (capacity) which cannot be exceeded without external intervention. Attempts to exceed the capacity of a container will result in degraded performance or failure.

A processing environment is a collection of processing systems that are capable of executing the workload for any of the workload units executing within the environment. The administrative processor has access to the storage subsystems) in its storage environment. Through the storage subsystems, it can identify all of the containers in each subsystem, the limits of those containers, the identity of all of the objects in each container, and the resource usage of each object.

A threshold is an artificial limit on utilization that is used by the capacity planning process to prioritize containers that need action. When the projected utilization of a container reaches the threshold, the container is selected to be managed, and action will be taken to prevent or alleviate the resource shortage in that container.

Capacity management is the process of projecting and managing the allocation of workload unit to processing systems within a processing environment so that capacity limits are not exceeded within a planning horizon. Capacity management is depicted by three high level steps: (1) collecting information about the processing environment, (2) projecting the state of the processing environment at some time in the future; and (3) defining actions to prevent the over commitment of any processing system.

The life expectancy of a processing system is the period of time from the last measurement of the system until the increase in resource consumption is expected to exceed the capacity of any one of the system's resources. If the change in resource consumption over time is non-positive and the system is operating below its capacity limit, then the life expectancy of the system is considered infinite. If the resource consumption exhibits positive growth for any system resource dimension, the life expectancy of the system is finite.

A system's expiration date is the date when the server workload is expected to exceed its capacity because of growth in workload. An expiration date is calculated using life expectancy as set forth in co-pending patent application Ser. No. 09/457,467 entitled "System and Method for Providing Property Histories of Objects and Collections For Determining Device Capacity Based Thereon", which was filed on Dec. 8, 1999, or capacity space as set forth in co-pending patent application Ser. No. 09/690,872, entitled "System and Method for Analyzing Capacity in a Plurality of Processing Systems, which was filed on Oct. 17, 2000, or some comparable method (see also: Daniel A. Menasce, Virgilio A. Almeida, and Larry W. Dowdy, "Capacity Planning and Performance Modeling: From Mainframes to Client-Server Systems", Prentice Hall, Englewood Cliffs, N.J., 1994 and Bucky Pope and Lily Mummer, "The Use of Life Expectancy to Manage Notes Domino E-Mail Storage", Proceedings of the Computer Measurement Group, CMG '99, December 1999). For the purposes of the present invention, the use of the terms "expiration date", "life expectancy", and "capacity space" will be understood to be mutually-interchangeable alternatives representing measurements of a processing system's capacity.

The impact of a workload unit is the effect on the system's expiration date that results from either adding the workload unit to the system or removing it. The impact is calculated by taking the difference between the expiration date before and after the workload change.

The system where this invention would apply is represented FIG. 1 comprising a processing environment having an administrative processor 101 is adapted to implement the inventive process. The administrative processor 101 has access to a data repository 102, such as a relational database, where the data can be saved and from which data can be retrieved. The administrative processor also has access to configuration data about properties of the processing environment 100, comprising processing systems 104a and 104b, and about workload needs and workload usage history data relating to the workload units 105a and 105b that are part of the processing environment.

The objects of interest for this invention are processing systems 104a and 104b that manage workload units. An example of work which is to be divided up into workload units to be managed by the respective processing systems is a sort program run on behalf of a computer user. Each workload unit has a unique identifier, within the processing environment. Workload units consume resources of the processing systems. The resources consumed by a workload unit are recorded by the processing system and the record of this consumption is transferred as the workload usage history to the administrative processor 101 and stored in the repository 102. Each resource has its own unit of measure. These consumption records are identified by the name of the workload unit and the time period of the consumption.

The administrative processor makes use of three inputs: a table of key planning dates, the set of tables of workload units for each processing system and the table of processing systems in the installation. With the relevant information, the impact value component 111 of the administrative processor associates each processing system in the processing environment with a key planning date on the planning horizon. An objective of the invention is to ensure that each processing system's expiration date falls after a specified key planning date. If the processing component 121 of the administrative processor finds that a system will run out of capacity before its assigned key planning date, it will perform an analysis and select workload units to move to another system. Then, it will search the other systems in the environment to determine where to place the workload unit. In general, removing workload from a system results in a later expiration date while adding workload to a system typically results in an earlier expiration date.

The analysis of the system capacities and selection of workload units for transfer continue until the objective is met whereby all systems' expiration dates are later than their key planning dates. The result of the analysis is a plan to move workload units between systems in the environment, If an assignment of workload that satisfies the planning dates is not possible, a partial plan can be created to improve the state of the system even though it fails to meet the ultimate planning objective.

Figure 2:
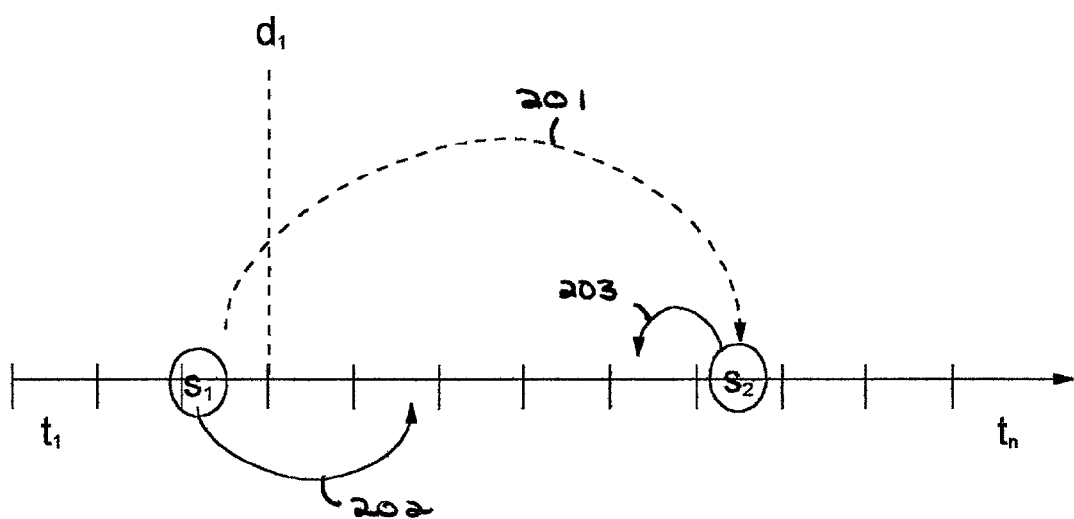
FIG. 2 provides a timeline and server placement example.

FIG. 2 illustrates the inventive methodology. The expiration date for system s1 places it before key planning date d1. By removing workload from s1, the system's expiration date is extended as represented by arrow 202. The process continues to remove workload until the server's expiration date falls after the key planning date. Workload removed from one system must, of course, be moved to another system in the group, depicted in FIG. 2 as arrow 201. Moving workload onto a server shifts that server's expiration date to the left on a timeline. FIG. 2 illustrates this with system s2. Adding workload to s2 moves its expiration date to the left as indicated by arrow 203.

Let Table D be a date table with i entries, one for each date in the planning horizon. Each date entry Di is a tuple of two values {di,ci} where di is the planning date and ci is a count representing the number of systems that must expire after that date. The administrative processor assumes that D has been created by some external means. Usually planning dates are chosen in such a way to minimize impact on service, such as holidays. Additionally, it must be noted that the number of systems that may be reconfigured on a given date may be affected by other resources, such as amount of available administrative personnel.

Let Table L be the table of j systems to be managed. Each entry Lj is a tuple of two values {sj,ej}, where sj is the name of the system j and ej is the expiration date for system j, calculated using life expectancy, capacity space, or some similar methodology. The number of servers j must equal the sum of the counts (ci) found in date table D.

Let Table W with k entries represent all of the workload units on the group of systems. Each entry Wk consists of a tuple of the following values {uk, sk} where uk is the identifier of the workload and sk is the name of the system that most recently served the workload.

Figure 3:
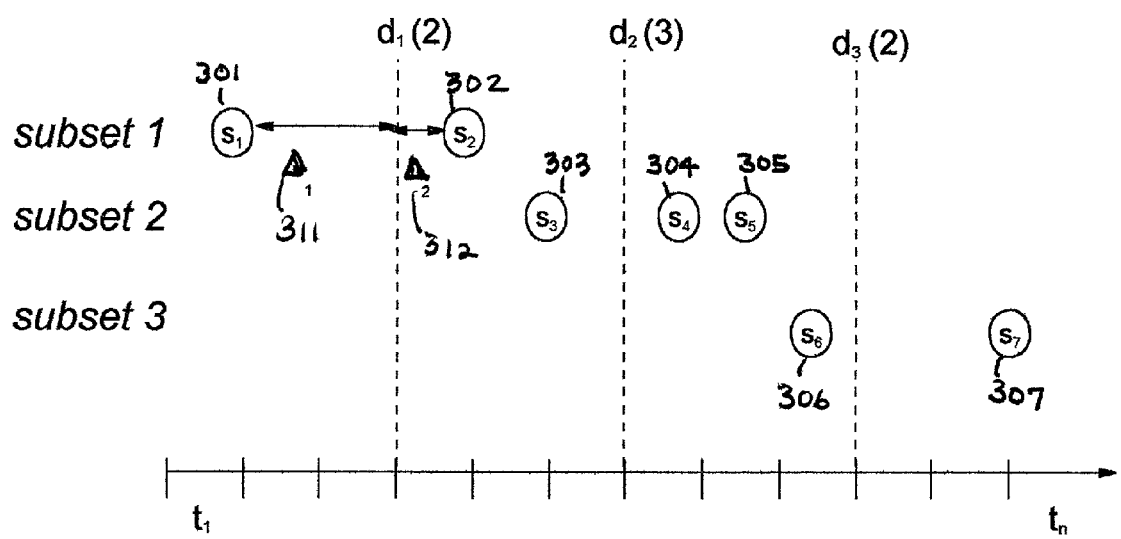
FIG. 3 illustrate a graph associating computer servers with key planning dates.

The invention works with date deltas as depicted in FIG. 3. FIG. 3 shows seven systems indicated by the circles 301-307 marked s1 to s7. The planning horizon is indicated by a timeline marked t1 to tn. Three key planning dates are indicated: d1, d2, and d3. The seven systems are divided into three subsets, one subset for each key planning date. The systems s1-s7 have been ordered in expiration date sequence and positioned above the planning horizon in line by their expiration date. Each key planning date has a number of systems assigned to it as depicted by the number in parentheses following the date: two for d1, three for d2, and two for d3. Subset 1 consisting of systems s1 and s2 are assigned to d1. One system, s1, expires before d1 and has a negative date delta as shown at 311 by $\Delta_1$. The second system, s2, has a positive delta date, $\Delta_2$, shown at 312, because the expiration data of the system fall after the key planning date.

The invention creates an output referred to as the move table M. Let Table M have l entries. Each move entry Ml is composed of three entries {ul, fl, tl} where ul is the designator for workload unit l, fl is the current location of the workload ("From" system), and tl is the next location of the workload ("To" system).

Figure 4:
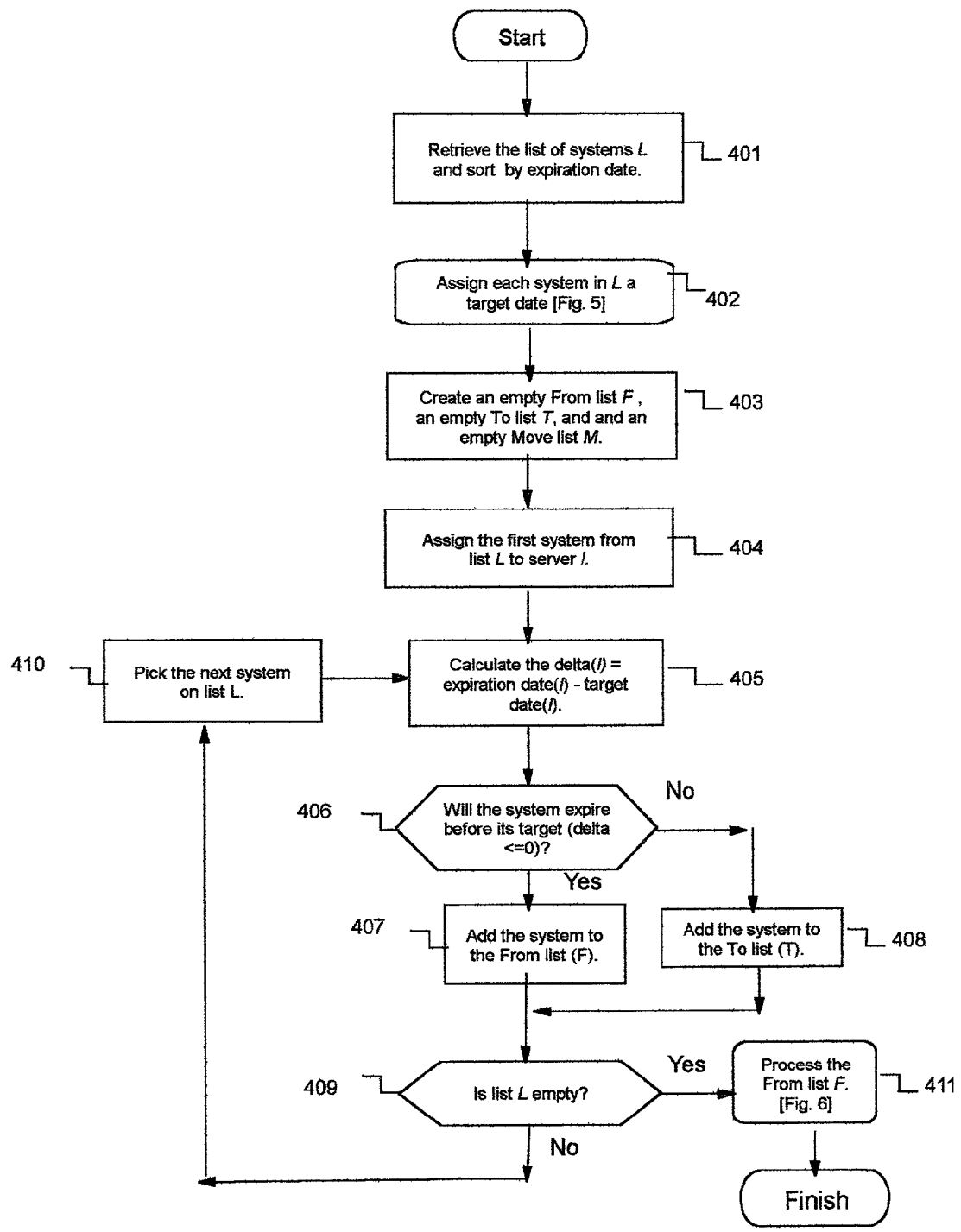
FIG. 4 provides a process flow diagram depicting the highest level of the methods of this invention.

FIGS. 4-11 depict one implementation of the invention, based on a greedy algorithm. FIG. 4 provides a process flow diagram depicting the highest level of the methods of this invention. The first step 401 is to retrieve the list of systems L from the repository. The list is sorted in ascending date sequence by the expiration date (e) of each system in the list. Step 402 assigns each system to a key planning date as is explained in FIG. 5. Next, in step 403, the From list F, the To list T and the Move list M are initialized with empty list structures. In step 404, the first system in list L is assigned as server l. Step 405 calculates the Δ for system l by subtracting the key planning date from the system's expiration date. Step 406 next determines if the server needs to have workload removed. If the system will expire before the key planning date, that is the Δ is negative, then action must be taken to remove workload. If, in step 406, the determination is made that the system will expire before its planning date, the system is added to the From list F in step 407. If the system will not expire before its key planning date, it is a candidate to receive workload and is added to the To list T (in step 408). Step 409 determines if all systems in list L have been allotted to either the From list or the To list. If there are more systems to process, step 410 picks the next system in the list, otherwise processing continues in step 411 as described starting with FIG. 6.

Figure 5:
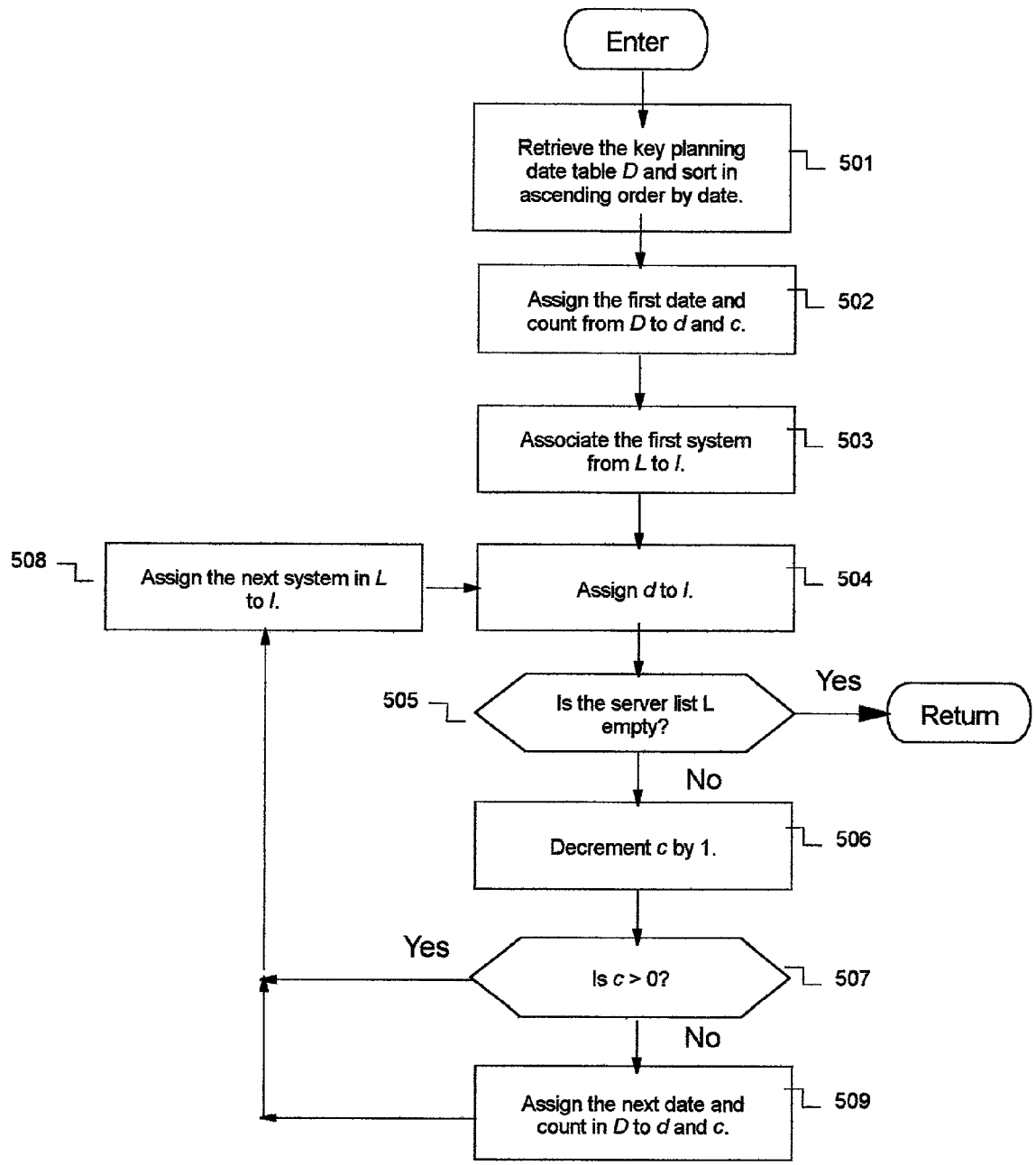
FIG. 5 provides a process flow diagram depicting the assignment of targets to list L.

FIG. 5 describes the procedure for assigning key planning dates to every system in list L. First, in step 501, the date Table D is retrieved from the repository and the key planning dates are sorted in ascending date sequence. In step 502, the date in the first tuple in Table D is assigned to d and the count value is set for c. The first system in List L is assigned as l in step 503. In step 504, planning date d is assigned to l. Step 505 tests to determine if all systems have been assigned a date and, if so, the process returns the completed list L. If there are more systems in List L, step 506 first decrements the count c to indicate that date d was assigned to l. If there are more systems to be assigned to the planning date d (i.e. c>0 in step 507), then the processing proceeds to step 508 where the next system is assigned as l, otherwise step 509 picks the next date in Table D, and processing continues with step 508.

Figure 6:
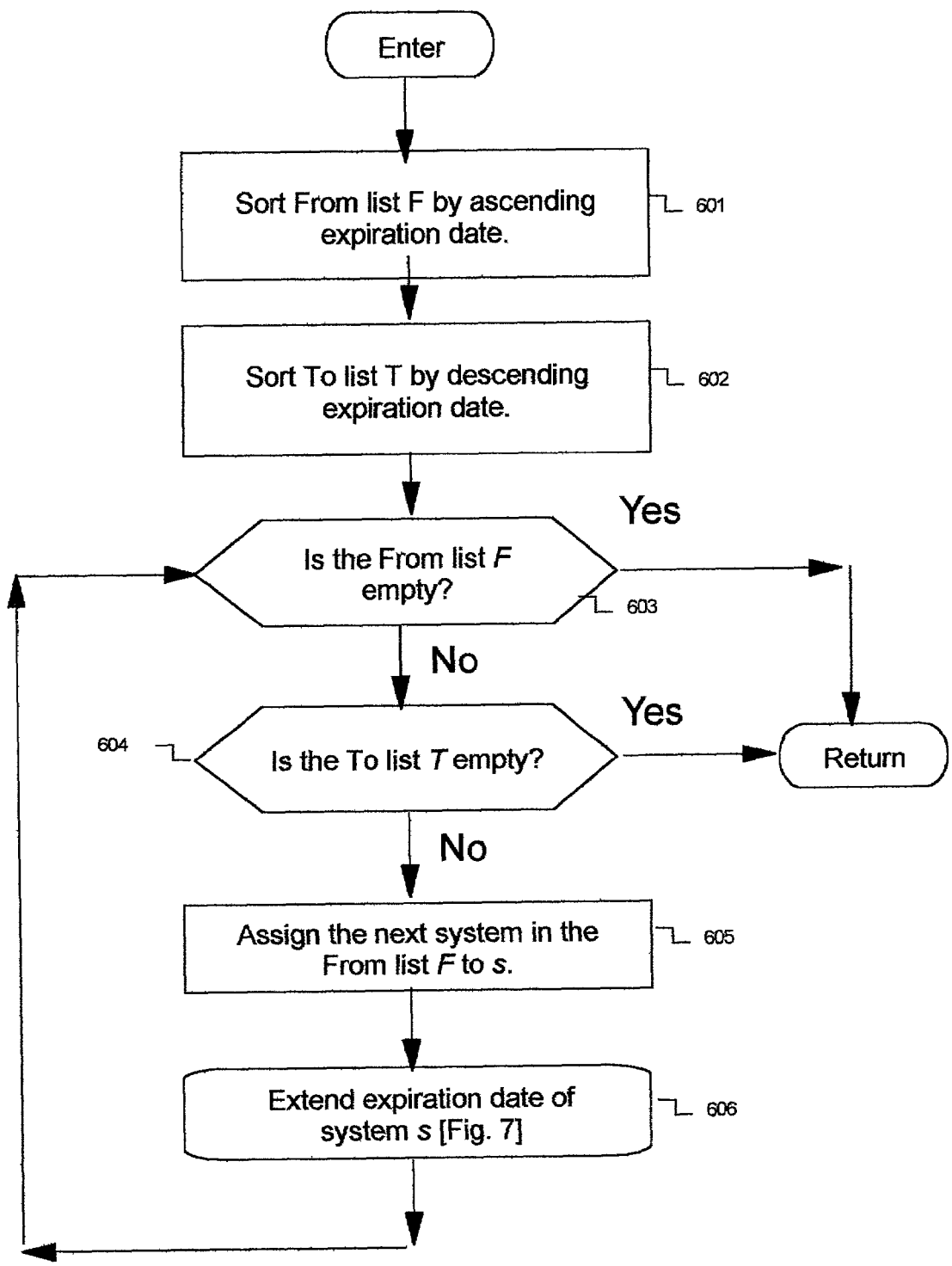
FIG. 6 provides a process flow diagram depicting the processing of the From list.

FIG. 6 describes the procedure for processing of the From list F. The From list comprises a list of the systems that need workload removed. Step 601 prioritizes the list in ascending expiration date sequence since the systems that expire the soonest must be addressed first, as there is less time to make changes to the installation. Step 602 prioritizes the To list of systems in descending expiration date sequence so that workload is moved to the server that is the farthest to the right on the planning horizon time line. This procedure is complete when either the From list or the To list is empty, as indicated by the decision boxes of steps 603 and 604. If the From list has entries, there are some systems that will expire before their target date and for which workload must be removed. When there are systems in the To list, there are potential candidates to receive the workload. Step 605 assigns the next system in the From list to s and step 606 performs the process of finding the right workload unit to remove and the right system to receive the workload unit, as further detailed with reference to FIG. 7.

Figure 7:
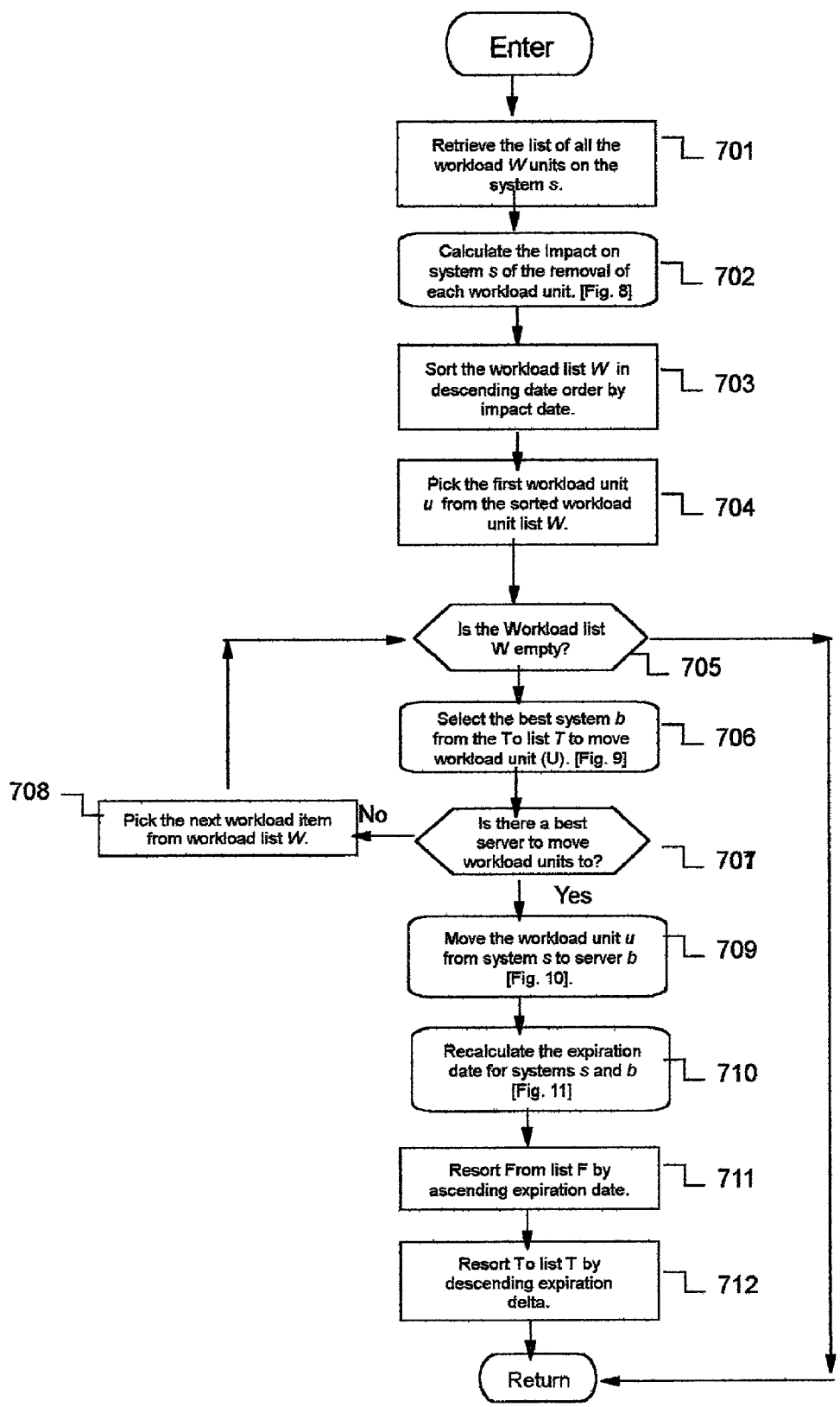
FIG. 7 provides a process flow diagram depicting the process flow for extending the expiration date of a computing system.

FIG. 7 details the process for determining how to extend the expiration date of a system. Step 701 retrieves a table of the workload that currently uses system s. Step 702 is a procedure (further detailed in FIG. 8) that determines the impact of removing each workload unit for the system. The workload list is sorted in descending order by impact in step 703 and the workload at the top of the list is selected in step 704. Step 705 tests to determine if the workload list is empty and if it is, the procedure is complete because there is no more work that is available to move. Step 706 is a procedure that finds the best server to receive the workload unit u. It may be that no system is capable of receiving workload unit u (as tested in step 707) in which case the next workload unit is selected in step 708 and the procedure returns to the test in step 705. If there is a system to receive unit u, the workload is moved in procedure 709 (FIG. 10) and the expiration date for system s is recalculated in step 710. Since the expiration dates of systems in the From and To list have been changed by the movement of workload unit u, the two lists are resequenced before the procedure exits.

Figure 8:
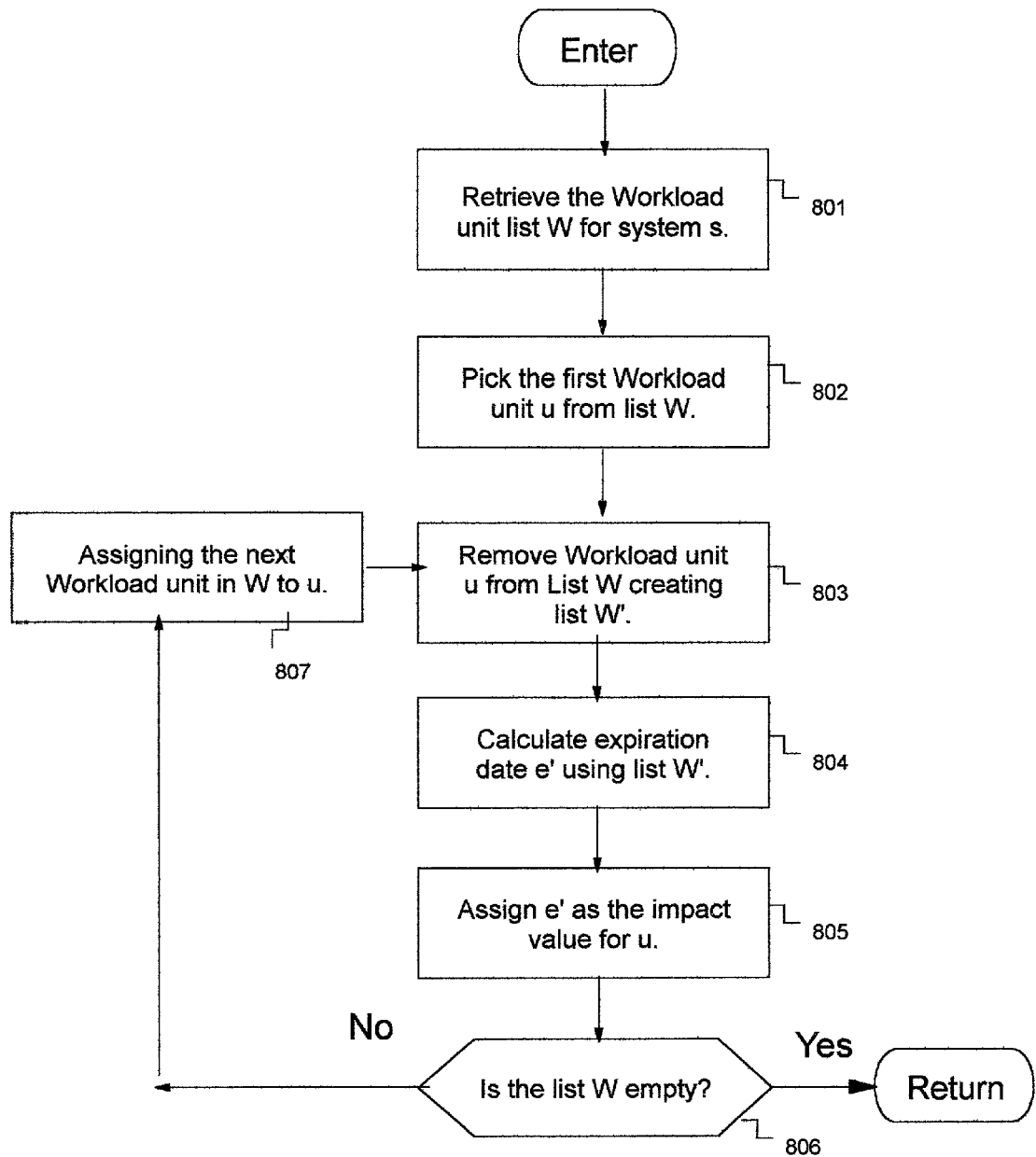
FIG. 8 provides a process flow diagram for calculating the impact of each workload unit on a computing system's expiration date.

FIG. 8 details the process for calculating the impact of each workload unit on a system. The unit of measure for impact is time, usually recorded in days. First, in step 801, the list of workload units assigned to the system in question is retrieved from the repository. Next, in step 802, the first workload unit is selected. It is here to be noted that there need be no particular order to the workload list for this procedure. The selected workload unit is temporarily removed from the list in step 804, and a new expiration date is calculated using the remainder of the list. The difference between this new expiration date and the original expiration date is assigned to the selected workload unit at step 805 as its impact, and the workload unit is returned to the list. If all workload units have been processed, the procedure completes. If not all workload units have been processed, the system proceeds to the next workload unit to be processed at step 807. When all iterations are completed, each workload unit will have been assigned an impact number that represents the change in expiration date if that workload unit, only, is removed.

Figure 9:
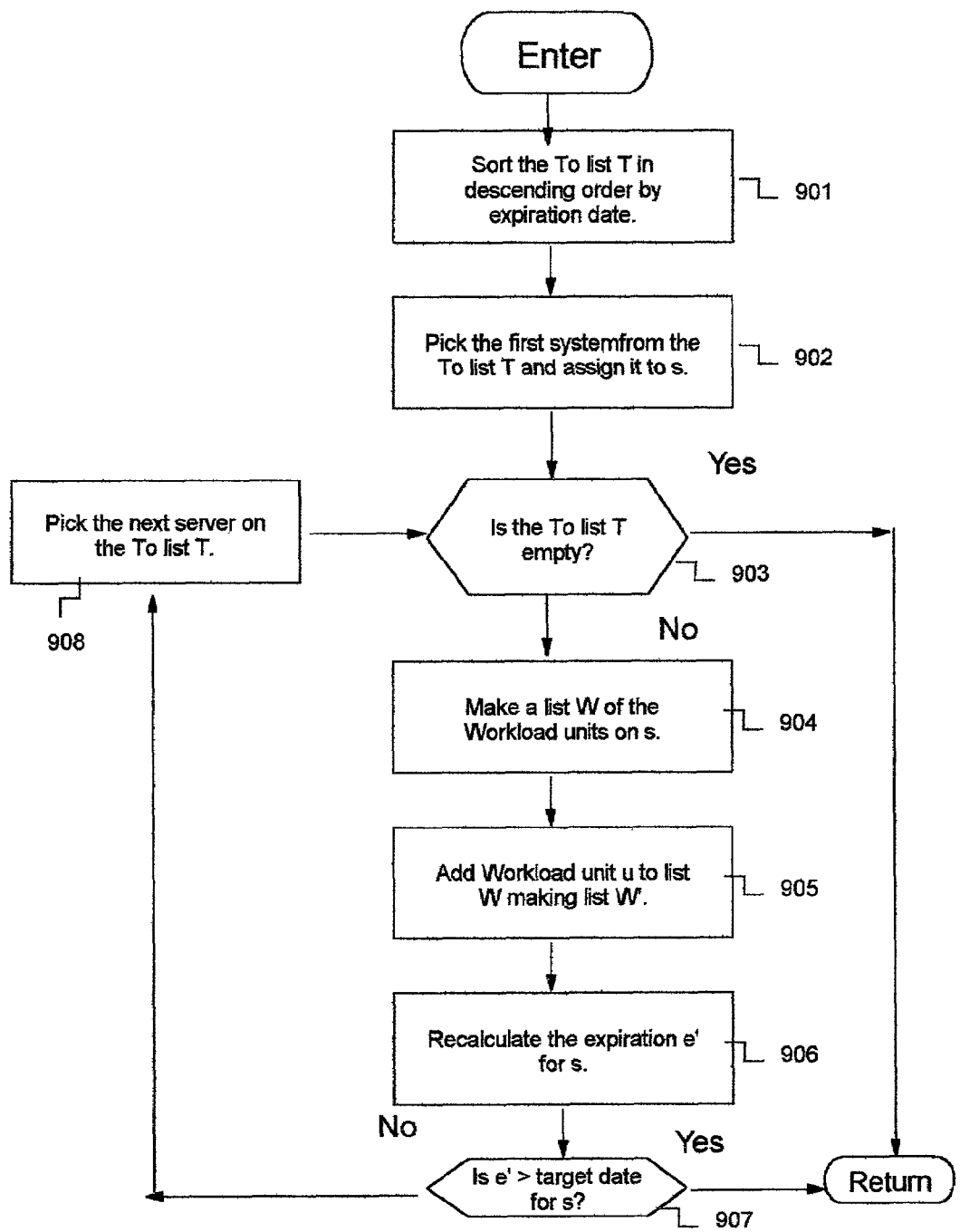
FIG. 9 provides a process flow diagram for selecting the best server in the To list.

FIG. 9 describes how the system is selected to receive a workload unit. First, the list of To systems must be ordered in priority sequence. Step 901 sorts the list of To systems in descending expiration date sequence. The use of expiration date is one way of prioritizing the list, although other prioritizing functions could be substituted at this point. The top system on the list is selected as the next candidate at step 902, as long as there are candidate To systems on the To list, as determined at step 903. In step 904, the list of workload units for that system is retrieved from the repository. The additional workload unit is added to the list at step 905 and the expiration date is recomputed in step 906. Step 907 compares the new expiration date with the selected systems key planning target date. If the expiration date still falls beyond the key planning data on the planning time line, the procedure is complete and the selected system is returned as the best candidate at step 910. If the addition of this workload causes the system expiration date to fall short of the key planning date, as determined at step 907, the method proceeds to step 908 where the next system on the list is selected as a candidate. The process continues until either an appropriate system is found (step 907) or until all systems have been examined and none have qualified to receive the workload, as determined at step 903.

Figure 10:
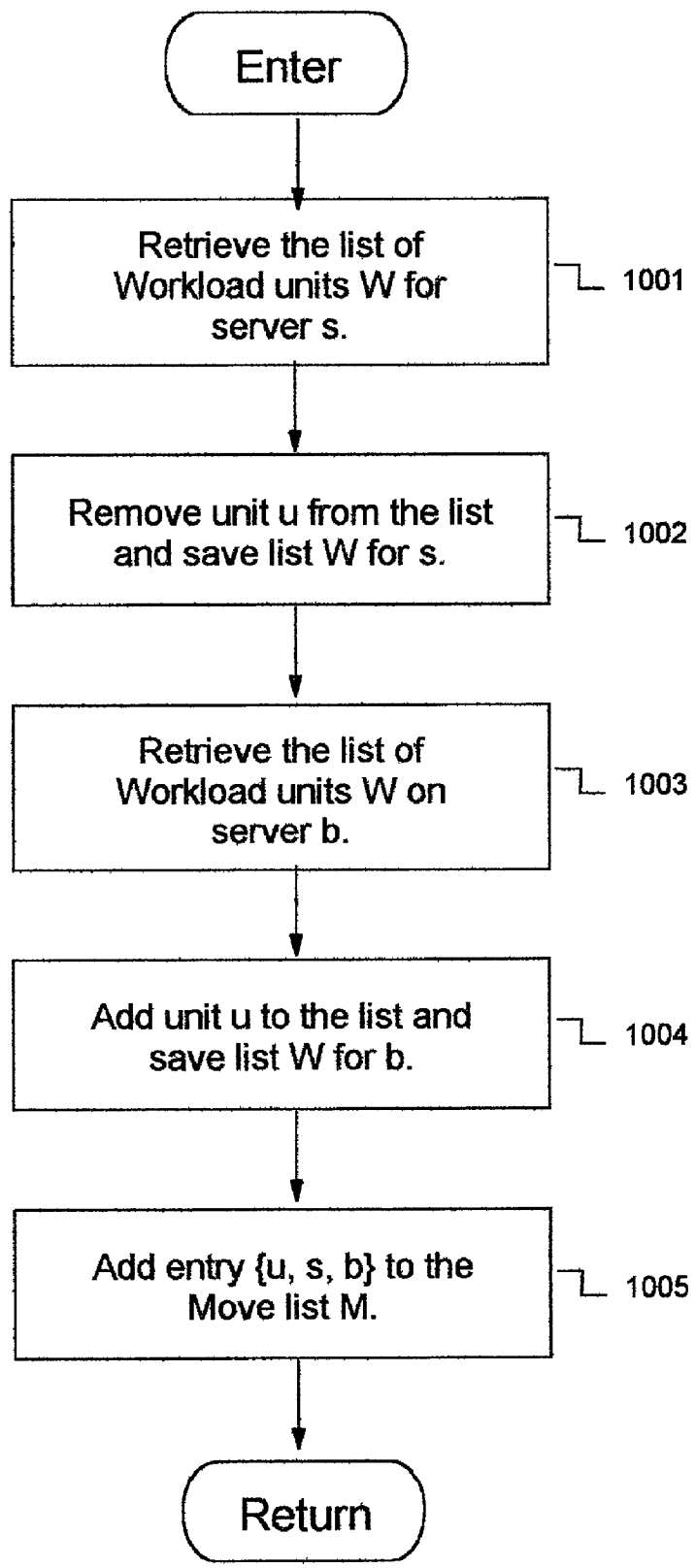
FIG. 10 provides a process flow diagram for moving the workload unit from the From to the To computing system.

When the process successfully finds a workload unit that can be moved, is creates an entry in the move table and updates the workload lists for the From and To systems. FIG. 10 illustrates the updating process. Step 1001 retrieves the workload unit list from the repository for the From system and step 1003 retrieves the workload unit list for the To system. The workload unit is removed from the From system workload list and the list is returned to the repository at step 1002. The unit is added to the To systems workload unit list and that list is returned to the repository at 1004. Finally, the tuple representing the name of the workload unit, the From and To system is added to the Move table in step 1005.

Figure 11:
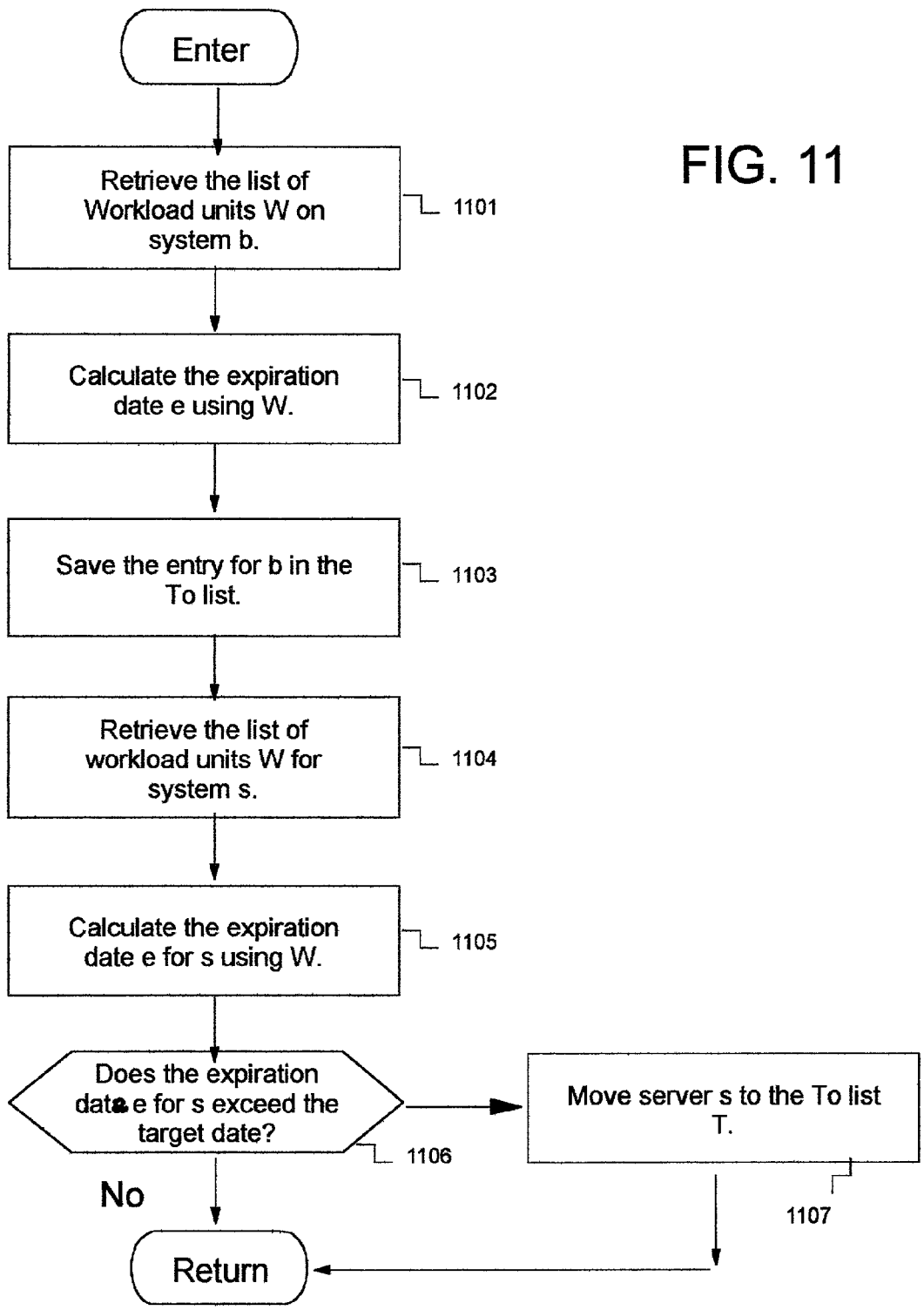
FIG. 11 provides a process flow diagram depicting the recalculation of the expiration date for systems s and b in accordance with the foregoing.

FIG. 11 is the last process in this method as it recalculates the expiration dates for the From and To systems. At step 1101 the workload unit list is retrieved from the repository for the To system and the expiration date of the To system is recalculated. The updated tuple is saved with the system identifier and the expiration date to the To list at step 1103. For the From server, the workload list is first retrieved from the repository (step 1104) and the expiration date is recalculated at 1105. The procedure tests for the possibility that the expiration date now falls after the key planning target date as determined at step 1106. If this is the case, the entry is moved to the To list at 1107, otherwise it remains of the From list.

While the invention has been described with reference to an illustrated system and several preferred process flow embodiments it will be apparent to one having skill in the relevant art that modifications can be made without departing from the spirit and scope of the invention as set forth in the appended claims.

Having thus described our invention, what we claim is:

1. A method for evaluating and distributing workload across a processing environment having a plurality of computer systems each having a plurality of assigned current workload units comprising the steps of:

calculating a plurality of impact values, one impact value for each current workload unit assigned for each of a plurality of computing systems in a processing environment each computer system having a plurality of assigned current workload units, wherein said calculating of each impact value comprises determining a change in system expiration date by assigning an impact number representing the number of days that the expiration date of the computer system would be changed should the current workload unit be removed from the system with all other workload units remaining the same;

determining the impact of moving the current workload unit from a donor computer system to a recipient computer system based on said impact values; and reassigning workload in the processing environment by moving at least one of said plurality of assigned current workload units to change expiration dates of at least two of said plurality of computer systems.

2. The method of claim 1 further comprising sorting said current workload units based on said impact values into a sorted impact list.

3. The method of claim 1 further comprising comparing the expiration date of each of said plurality of computing systems to at least one target service date for servicing each of said plurality of computing systems.

4. The method of claim 3 further comprising altering workload in the processing environment to change the expiration date relative to the target service date for at least two of said plurality of computer systems.

5. The method of claim 3 further comprising the steps of:

creating a From list of computer systems for which the expiration date precedes the at least one service date;

creating a To list of computer systems for which the expiration date is later than said at least one service date; and reassigning current workload units from computer systems on said From list to computer systems on said To list based on said impact values.

6. The method of claim 5 further comprising calculating new expiration dates for computer systems on said From and said To lists after said reassigning.

7. Apparatus for evaluating and distributing workload across a processing environment having a plurality of computer systems each having a plurality of current assigned workload units comprising:

an administrative processor comprising:

an impact value component for calculating a plurality of impact values, one impact value for each current workload unit assigned to each of a plurality of computing systems in a processing environment each computer system having a plurality of assigned current workload units, wherein said calculating of each impact value comprises determining a change in system expiration date by assigning an impact number representing the number of days that the expiration date of the computer system would be changed should a current workload unit be removed from the system with all other workload units remaining the same; and a processing component for determining the impact of moving the current workload unit from a donor computer system to a recipient computer system based on said impact values and for reassigning workload in the processing environment by moving at least one of said plurality of assigned current workload units to change expiration dates of at least two of said plurality of computer systems.

8. The apparatus of claim 7 further comprising at least one storage location accessible by the administrative processor for storing data relating to said plurality of computer systems.

9. A program storage device readable by machine storing a program of instructions executable by the machine to perform method steps for evaluating and distributing workload across a processing environment having a plurality of computer systems each having a plurality of assigned current workload units, said method comprising the steps of:

calculating a plurality of impact values, one impact value for each current workload unit assigned for each of a plurality of computing systems of a processing environment each computer system having a plurality of assigned current workload units, wherein said calculating of each impact value comprises determining a change in system expiration date by assigning an impact number representing the number of days that the expiration date of the computer system would be changed if a current workload unit is removed from the system with all other workload units remaining the same;

determining the impact of moving the current workload unit from a donor computer system to a recipient computer system based on said impact values; and reassigning workload in the processing environment by moving at least one of said plurality of assigned current workload units to change expiration dates of at least two of said plurality of computer systems.

10. The device of claim 9 wherein the method further comprises sorting said current workload units based on said impact values into a sorted impact list.

11. The device of claim 9 wherein the method further comprises comparing the expiration date of each of said plurality of computing systems to at least one target service date for servicing each of said plurality of computing systems.

12. The device of claim 11 wherein the method further comprises altering the workload in the processing environment to change the expiration date relative to the target service date for at least two of said plurality of computer systems.

13. The device of claim 12 wherein the method further comprises the steps of:

creating a From list of computer systems for which the expiration date precedes the at least one service date;

creating a To list of computer systems for which the expiration date is later than said at least one service date; and reassigning workload units from computer systems on said From list to computer systems on said To list based on said impact values.

14. The device of claim 13 wherein the method further comprises calculating new expiration dates for computer systems on said From and said To lists after said reassigning.

15. A method for evaluating and distributing workload across a processing environment having a plurality of computer systems each having a plurality of assigned workload units comprising the steps of:

(a) obtaining a list of a plurality of computer systems in a processing environment having a plurality of computer systems each having a plurality of assigned current workload units;

(b) assigning a key service date for each computer system on said list of a plurality of computer systems;

(c) determining a system expiration date for each computer system based on assigned current workload units;

(d) comparing the determined system expiration date to the key service date for each computer system;

(e) adding a computer system to a Fromlist on a move table when the determined system expiration date is earlier than the key service date for said computer system;

(f) adding a computer system to a Tolist on a move table when the determined system expiration date is later than the key service date for said computer system;

(g) evaluating the impact of moving at least one current workload unit from a selected computer system on the Fromlist to a selected computer system on the Tolist;

(h) repeating steps (c) to (g) until all Fromlist entries have been evaluated; and (i) reassigning workload on said selected computer systems by moving at least one said plurality of assigned current workload units.

16. The method of claim 15 wherein said evaluating impact comprises the steps of:

selecting a computer system on the Tolist to be evaluated;

assigning a plurality of impact values, one impact value for each current workload unit assigned to the selected computer system on the Fromlist, wherein each impact value represents a number of days that the expiration date of the computer system would be changed if the workload unit was removed from the system with all other workload units remaining the same;

identifying at least one selected current workload unit on said selected computer system on the Fromlist for which removal of the at least one selected unit would move the expiration data of the computer system to later than its key service date; and recalculating expiration date for a selected computer system on the Tolist should the at least one selected current workload unit be moved from said selected computer system on the Fromlist to the selected computer system on the Tolist based on the impact value of said at least one selected current workload unit;

determining that the at least one selected current workload unit should be moved if the recalculated expiration date of the selected computer system on the Tolist is later than its key service date; and selecting a different computer system on the Tolist to be evaluated when the recalculated expiration date of the selected computer system on the Tolist is earlier than its key service date.

17. A program storage device readable by machine storing a program of instructions executable by the machine to perform method steps for evaluating and distributing workload across a processing environment having a plurality of computer systems each having a plurality of assigned current workload units, said method comprising the steps of:

(a) obtaining a list of a plurality of computer systems in a processing environment having a plurality of computer systems each having a plurality of assigned current workload units;

(b) assigning a key service date for each computer system on said list of a plurality of computer systems;

(c) determining a system expiration date for each computer system based on assigned current workload units;

(d) comparing the determined system expiration date to the key service date for each computer system;

(e) adding a computer system to a Fromlist on a move table when the determined system expiration date is earlier than the key service date for said computer system;

(f) adding a computer system to a Tolist on a move table when the determined system expiration date is later than the key service date for said computer system;

(g) evaluating the impact of moving at least one current workload unit from a selected computer system on the Fromlist to a selected computer system on the Tolist;

(h) repeating steps (c) to (g) until all Fromlist entries have been evaluated; and (i) reassigning workload on said selected computer systems by moving at least one of said plurality of assigned current workload units based on said evaluating.

18. The program storage device of claim 17 wherein said evaluating impact comprises the steps of:

selecting a computer system on the Tolist to be evaluated;

assigning a plurality of impact values, one impact value for each current workload unit assigned to the selected computer system on the Fromlist, wherein each impact value represents a number of days that the expiration date of the computer system would be changed if the current workload unit was removed from the system with all other workload units remaining the same;

identifying at least one selected current workload unit on said selected computer system on the Fromlist for which removal of the at least one selected unit would move the expiration data of the computer system to later than its key service date; and recalculating expiration date for a selected computer system on the Tolist should the at least one selected current workload unit be moved from said selected computer system on the Fromlist to the selected computer system on the Tolist based on the impact value of said at least one selected current workload unit;

determining that the at least one selected current workload unit should be moved if the recalculated expiration date of the selected computer system on the Tolist is later than its key service date; and selecting a different computer system on the Tolist to be evaluated when the recalculated expiration date of the selected computer system on the Tolist is earlier than its key service date.

19. Apparatus for evaluating and distributing workload across a processing environment having a plurality of computer systems each having a plurality of assigned current workload units comprising:

an administrative processor comprising:

a processing component for (a) obtaining a list of a plurality of computer systems in a processing environment having a plurality of computer systems each having a plurality of assigned current workload units;

(b) assigning a key service date for each computer system on said list of a plurality of computer systems;

(c) determining a system expiration date for each computer system based on assigned current workload units;

(d) comparing the determined system expiration date to the key service date for each computer system;

(e) adding a computer system to a Fromlist on a move table when the determined system expiration date is earlier than the key service date for said computer system;

(f) adding a computer system to a Tolist on a move table when the determined system expiration date is later than the key service date for said computer system;

(g) evaluating the impact of moving at least one current workload unit from a selected computer system on the Fromlist to a selected computer system on the Tolist;

(h) repeating steps (c) to (g) until all Fromlist entries have been evaluated; and (i) reassigning workload on said selected computer systems by moving at least one of said plurality of assigned current workload units based on said evaluating.

20. The apparatus of claim 19 wherein said administrative processor comprises an impact value component for:

selecting a computer system on the Tolist to be evaluated;

assigning a plurality of impact values, one impact value for each current workload unit assigned to the selected computer system on the Fromlist, wherein each impact value represents a number of days that the expiration date of the computer system would be changed if the workload unit was removed from the system with all other workload units remaining the same;

identifying at least one selected current workload unit on said selected computer system on the Fromlist for which removal of the at least one selected unit would move the expiration data of the computer system to later than its key service date; and recalculating expiration date for a selected computer system on the Tolist should the at least one selected current workload unit be moved from said selected computer system on the Fromlist to the selected computer system on the Tolist based on the impact value of said at least one selected current workload unit;

determining that the at least one selected current workload unit should be moved if the recalculated expiration date of the selected computer system on the Tolist is later than its key service date; and selecting a different computer system on the Tolist to be evaluated when the recalculated expiration date of the selected computer system on the Tolist is earlier than its key service date.

* * * * *